June 10, 1930.  A. E. OSWALD  1,762,735
ELECTRIC MOTOR
Filed Feb. 20, 1925   2 Sheets-Sheet 1

Inventor:
Alfred E. Oswald
by B. C. Stickney
Attorney

June 10, 1930.  A. E. OSWALD  1,762,735
ELECTRIC MOTOR
Filed Feb. 20, 1925  2 Sheets-Sheet 2
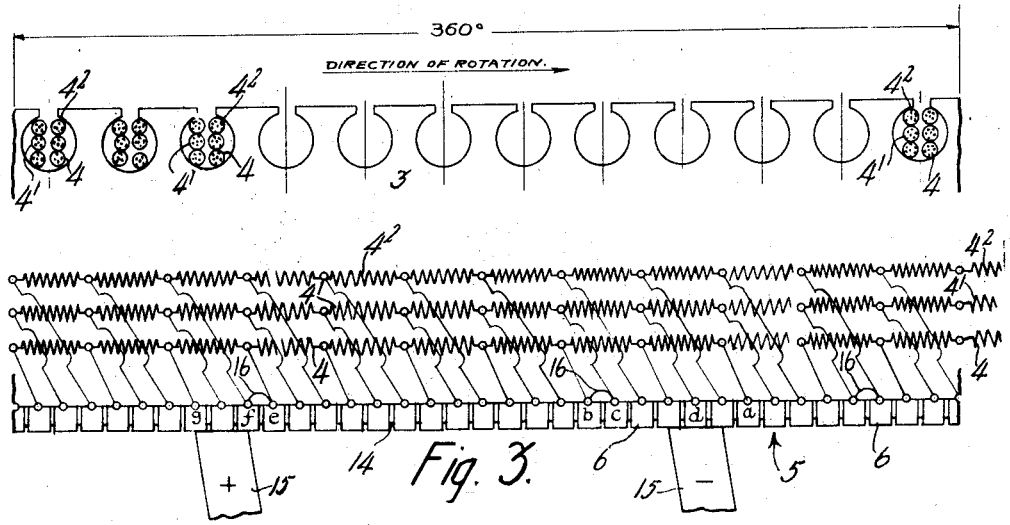
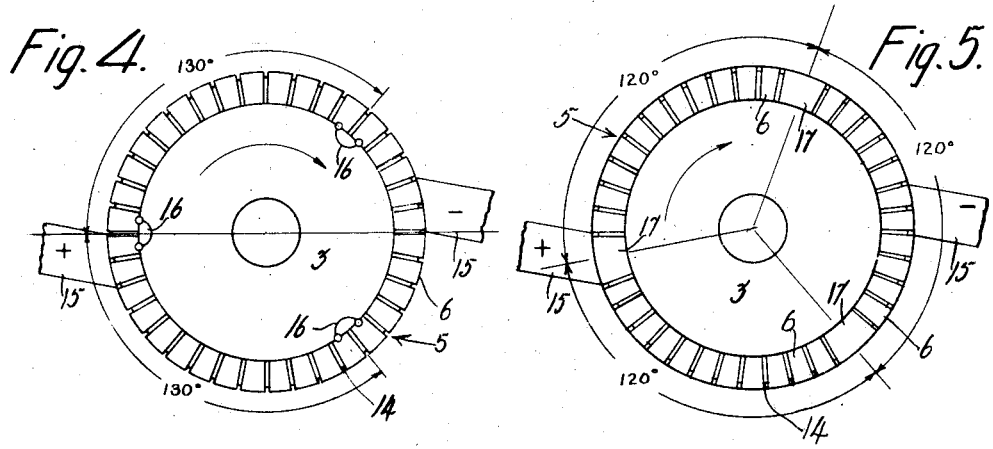
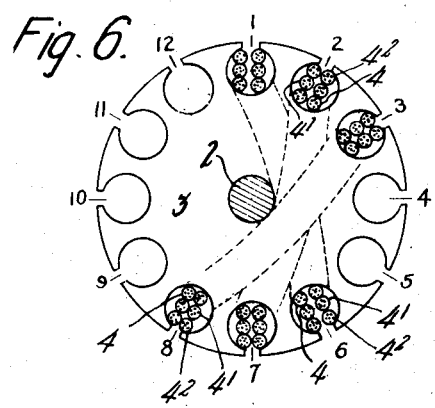
Inventor:
Alfred E Oswald
by C C Stickney
Attorney Patented June 10, 1930

1,762,735

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

ELECTRIC MOTOR

Application filed February 20, 1925. Serial No. 10,462.

My invention relates to the commutator type of motor; more specifically my invention relates to certain improvements in the construction of the commutator, whereby sparking at the brushes is substantially prevented. My invention also relates to certain other improvements, involving combinations of elements for reducing, as well as preventing, sparking around the commutator and at the brushes, all of which are directed to the efficient operation of the motor, and all of which improvements and combinations will more fully appear hereinafter.

It is a matter of common knowledge in the art of the commutator type of motor that when a commutator armature is used in the operation of a motor of this type by alternating current, there is a positive tendency of sparking at the commutator brushes. Whenever a brush touches two commutator bars or segments, an armature winding is short circuited thereby. At the moment of this short circuiting, the armature coil surrounds the field pole magnetic circuit through the armature; so that the armature coil is related to the field winding as the short-circuited secondary coil of a transformer, of which the field winding is the primary coil; therefore, an excessive short-circuit current is produced through the armature coil and through the end face of the brush in contact with the commutator and the result is an excessive sparking at the brush tips when the commutator segments pass from under the brushes. In order to prevent or substantially reduce sparking at the brush tips when the commutator segments pass from under the brushes, I made what I call an equalizer invention applied to the commutator, which will be described more particularly hereinafter. In the meanwhile, I will state that I also combine my equalizer invention with several other well-known features in the motor art, such as, for examples, a drum wound armature and a plurality of windings thereon; and under cut the mica insulation between the segments of the commutator; and employ or use reaction brushes, which kind of brushes are set at an angle or tangent to the commutator with the commutator cylinder rotating against the brush angle. I might explain that my armature may be wound with a plurality of simplex windings, and when the armature is wound with three simplex windings, for example, the brushes do not touch more than two or three commutator segments at a time, and, therefore, the brushes can not short circuit any one of the three armature windings or coils. If there are more than three simplex windings on the armature, then the brushes are so dimensioned that they can not span more commutator segments at a time than the number of windings. To employ triple windings is, therefore, an advantage, of course, so far as preventing the short circuiting of the windings is concerned; but, nevertheless, there is still serious sparking at the brush tips when the commutator segments connected to the three circuits comprised of the three armature windings successively pass from under the brushes and, thereby, successively open the circuits of the coils. In order to avoid sparking, I apply my equalizer invention to the windings; which equalizer invention can be embodied and applied to the commutator by connecting two adjacent commutator segments or bars by solder or other kind of current-conducting material, suitable for the purpose of conductively connecting the adjacent segments together, or by a short length of copper wire, or by forming two adjacent segments or bars of a single width into one segment of double the width of the single bar, or, stated in other words, substantially of the same width of two single bars placed together side by side. I locate my equalizers on the commutator or armature at equal distances apart around the same, or as nearly as possible equal distances apart from each other; of course whether the equalizers can be spaced equal distances apart from each other depends on the number of commutator bars or segments used in the particular commutator.

It is understood, of course, that while it may facilitate making the equalizer connections, between the windings, by simply joining two commutator bars by short wires or otherwise, yet it would not depart from the scope of my invention to make the equalizer connections within or at the armature and run a single wire from each of such connections to a single commutator bar.

It will be perceived that, with my equalizer invention applied to the windings of a drum armature wound with three simplex windings, when the segments of the commutator pass from under the brushes, the circuits formed of the windings in the armature are not opened by the segments leaving the brushes; but instead the circuits which otherwise would be opened by the segments leaving the brushes remain closed by reason of the current conductor connections afforded by the equalizers, and the current in those circuits remaining closed by the use of the equalizers finds a return path through one or more of the equalizers to one or more of the other individual circuits afforded by the windings connected to any particular segment at that instant in contact with one of the brushes, and, as a result, sparking at the brush tips is substantially prevented.

The reason I employ the well-known design of a drum armature and three windings on it is that it so happens that that design of construction lends itself to be conveniently applied to, and used, with my equalizer invention for its special purpose of substantially preventing sparking at the brushes. Nevertheless, my equalizer invention can be used with an armature wound with two windings, or more than three windings, or, in brief, with any number of windings more than one winding on the armature, and accomplish its purpose of substantially preventing sparking. The proper number of equalizers to be used depends, generally speaking, on the number of plurality of windings used; that is to say, for examples, if two windings are used on the armature, then and in that case two equalizers should be used and spaced equal distances apart from each other in the commutator, or nearly equal distances apart from each other as possible, depending on the number of commutator bars or segments in the commutator; if three windings be used, then and in that case three equalizers should be employed; if four windings be used then and in that case four equalizers should be used, and so on in respect to still larger numbers of windings, the number of equalizers being the same as the number of simplex windings.

In order to make it clear as to how I connect the simplex windings to afford a by-pass into and through other windings for the current, which would otherwise be interrupted at the brushes, I will assume for illustration that there are four simplex windings on the armature. In such an embodiment there will be four equalizers substantially equally spaced around the armature. Designating the four windings as $a$, $b$, $c$ and $d$, the four equalizers would be connected as follows: one joining $a$ and $b$; one joining $b$ and $c$; one joining $c$ and $d$; and one joining $d$ and $a$.

It will be seen, therefore, that in my system of connecting the simplex windings I join the same in pairs, there being as many pairs as there are windings.

In regard to my resorting to the expedient of undercutting the commutator mica, it is well known that undercutting the mica insulation reduces sparking at the brushes, and, in that respect, undercutting the mica lends its aid to my improvement of equalizers for effecting substantially the prevention of sparking. Briefly explained, by undercutting the mica, there is no mica surface presented on the surface of the commutator under the brushes upon which carbon can be deposited or held or embedded to cause flashing around the commutator, nor any mica surface to expand by heat outwardly beyond the surface of the copper segments and wear down under the brush faces slower than the copper surface of the commutator segments, and thereby produce an uneven surface of the commutator, and consequent sparking at the commutator from that cause.

In regard to my purpose in resorting to the use of a commutator reaction brush, which is a brush set at a forward angle to the commutator so that the commutator rotates against the brush at the angle at which the brush is set, it is my understanding that a reaction commutator brush is used only on very large motors at present; but it is claimed for the reaction brush generally that it reduces sparking; and, therefore, it serves to lend its aid to my equalizer invention substantially to prevent sparking at the brushes. I might also mention that the forward angle of the setting of the brush against the rotation of the commutator also lessons wear of the brush faces against the commutator.

Having set forth the nature and object of my invention, I will now proceed to describe it, and its application to a commutator type of motor, and more particularly as applied to the convertible type of motor, as shown in the accompanying drawings, in which—

Figure 3 is a developed view of slots in a drum wound armature, inductors, windings, commutator segments, brushes and equalizer connections for a bi-polar motor, to illustrate the connections made between the armature windings, commutator segments, equalizers, etc.

Figure 4 is a view looking at the end of a 36-segment commutator, and shows the equalizer invention connections to the segments, undercut mica insulation and reaction brushes.

Figure 5 illustrates a 36-segment commutator, with my equalizer invention applied thereto embodied in three equalizers of double-width segments and spaced equal distances apart from each other in the commutator.

Figure 6 illustrates an end view of a drum wound armature with twelve slots in it, and three windings in a slot, showing how the windings span from one armature tooth to another.

Figure 1:
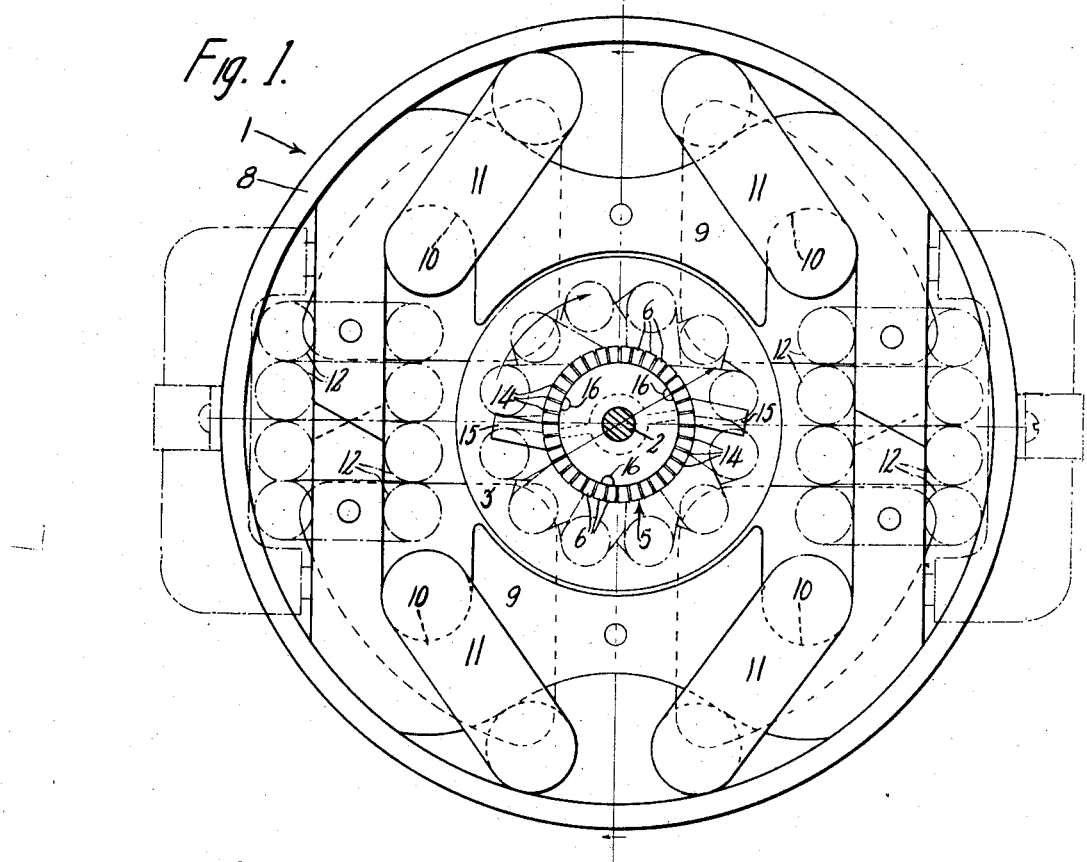
Figure 1 is a general construction or assembly view of a commutator type motor to which my equalizer invention is applied.
Figure 2:
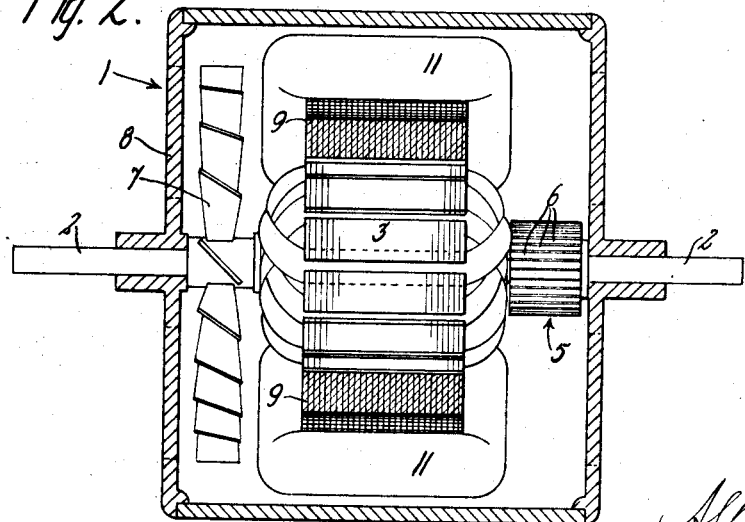
Figure 2 is a sectional view of the assembly view, Figure 1.

While my improvement of an equalizer invention can be used in any alternating or direct current type of commutator motor, I have shown it herein as applied to my convertible motor, as disclosed in my application, Serial No. 427,346, filed November 30, 1920 (now Patent No. 1,554,647, dated September 22, 1925).

In that invention, for alternating current, I employ a comumtator which connects the rotating armature in series with certain auxiliary coils therein as used by me, and I regulate the speed of the convertible motor by means of a novel combination of, or arrangement between, the field coils of the motor and said auxiliary coils. In that motor, the field coils are in shunt or across the voltage-supply mains, and the armature windings and auxiliary coils are connected in series; and both field and said auxiliary coils are wound on one and the same endless magnet core.

In describing the present invention, the motor 1 is shown herein as assembled or as a whole, as a bi-polar motor, with its shaft 2 carrying a wound armature 3 containing twelve slots, six inductors in a slot and three windings 4, 4¹ and 4², see Figures 3 and 6, and suitable for alternating current; but the windings might instead be only two windings, or more than three windings, as has already been explained. The armature is provided at one end with a commutator 5, comprised of segments or bars 6. I have shown a cooling fan 7 on the other end of the motor-shaft, and a casing 8 enclosing the motor. The armature is shown as drum wound and with three windings more conveniently to illustrate the principle and application of my equalizer invention and the arrangement and connections of the windings to the commutator segments, etc.

In Figure 1 there is shown an endless magnet core 9 with bends 10 in it, and field coils 11 wound across the bends 10 in the magnet core, with the field coils arranged conveniently in pairs and set at an incline to each other, as shown in Figure 1. The auxiliary coils 12 are wound on the same endless core that the field coils are wound on and placed between the field coils between the two poles. It is unnecessary further to describe herein my convertible motor, disclosed in my application above mentioned, since I merely illustrate it herein with such parts of it assembled together spoken of above as will identify it herein, and show my present invention as applied to it, and also as illustrating its application to a commutator type of motor.

In Figures 3 and 4, I have shown in connection with a commutator 5, and its segments or bars 6, with the pieces of mica 14 between the segments as undercut or their outward edges not reaching to the outer surface of the commutator; and also the reaction brushes 15 set at a forward angle to the commutator, that is to say, at an angle against the direction of rotation of the commutator, which may be increased if the increase be found to be a more satisfactory angle. In Figure 3 I have shown the armature windings 4, 4¹ and 4² with their terminals connected to the commutator bars 6, as is the usual practice. I have shown three equalizers in the drawings, which may be obtained by soldering together two adjoining segments or connecting them together by a short piece of copper wire 16, as shown in Figures 3 and 4, or double-width segments 17 may be inserted in the commutator amongst the single-width segments, as shown in Figure 5, for two adjacent single-width segments conductively connected together. In that Figure 5, I have shown three double-width segments 17 in the commutator in the place of three pairs of two adjoining single-width segments 6. In Figure 4 the commutator is indicated as containing thirty-six single-width segments or bars and three short pieces of wire 16, each connecting a pair of adjacent segments; whereas, in Figure 5, the commutator is indicated as containing thirty-three single-width segments 6 and three double-width segments 17, the latter spaced equal distances apart from each other in the commutator. I prefer this arrangement for use with a thirteen-toothed armature, with three windings laid in the slots of the armature. In Figure 6 I have indicated an armature with twelve teeth and three windings laid in the slots indicating that the windings are laid in all of the slots. In Figures 3, 4 and 5, pairs of adjacent commutator bars are shown as connected together; in Figure 5 in the form of double-width segments 17, and in Figures 3 and 4 as short pieces of wire 16. In each of Figures 3, 4 and 5 two reaction brushes 15, positive and negative, set at an angle to the commutator, are shown; in Figure 5 one brush, that at the right hand looking at the drawings, is shown as spanning two single-width segments, and the brush shown at the left hand as spanning a double-width segment. In Figure 4 the brush at the right hand is shown as spanning two single-width segments, and the brush at the left hand as spanning also two single-width segments, but one of the two segments is connected by an equalizer consisting of a short piece of wire 16 to an adjacent segment which is not shown under the brush. In Figure 3 both brushes are shown as spanning three single-width segments, with one of them connected to a segment not under the brush. The brushes as shown are not touching more than three segments at any one time, and, therefore, are not shown as short circuiting any of the armature windings. It will also be perceived that when the commutator segments pass from under the brushes, the circuits between the brushes and armature windings are not opened in effect as the result of the segments leaving the brushes, and, therefore, substantially no sparking at the commutator is caused by opening the circuits by the segments passing from under the brushes, because the equalizer invention connects two of the segments together, and thereby a circuit is closed through one or more of the equalizer connections, as the case may be, for the current to flow through one or more of the other simplex windings on the armature as may be connected at that instant to any particular segment then in contact with one of the brushes, and consequently substantially the tendency to sparking at the brushes is lessened when the segments pass from under the brushes. For illustration, let it be assumed that the segment $a$ at the immediate right hand of the negative brush, shown at the right hand looking at Figure 3 of the drawings, has just left that brush; it will be observed that that particular segment is shown as connected to the winding 4, so that when that particular segment passed from under the brush, there is a circuit then for the current in it through the winding 4 to a segment $b$ which is connected by a wire 16 to an adjacent segment $c$, and from that adjacent segment to the winding $4^1$, and from that winding $4^1$ to a segment $d$ that is under the negative brush at that instant, and, therefore, it will be seen that when the segment $a$ in question passed from under the negative brush it did not open in effect the circuit of the winding 4, because one of the equalizer connections 16 closed a path for the current from the winding 4 to another winding $4^1$, and so it is similarly as to all of the segments when they pass from under the brushes.

Referring to the positive brush, Figure 3, it will be observed that the segment $e$ at the right hand of the positive brush is connected by an equalizer wire 16, to the adjacent segment $f$ under said brush, and that when said segment at the right hand passed from under the brush a temporary short circuit was made from said segment through the equalizer connection conductor wire to the adjacent segment $f$, and from the latter segment through the brush to the segment $g$ at the left hand under the brush, and from that particular segment to the winding 4, and through it thence to the segment $e$ in question that passed from under the positive brush, but there is no sparking, which is one of the objects of my invention, and if the heat be increased as the result of the temporary short circuiting, nevertheless it is confined to the small number of short circuits established by the equalizer connections, and as the number of equalizer connections is small, the number of short circuits is likewise small, and the opportunities for increasing the heat are likewise small, and consequently increase of the heat is kept down to a minimum.

While I have described my equalizer invention as being applicable to my convertible type of commutator motor, I do not want to restrict my equalizer invention to that special motor, as the invention is applicable to any other commutator type of motor, for example, a universal alternating current motor, or a direct current motor, or any commutator type of motor.

Variations may be resorted within the scope of the invention, and portions of the improvements may be used without others.

Having thus described my invention, I claim:

1. An armature, having slots, including a winding having a plurality of at least three parallel reentrant sections, each section having a plurality of series connected coils wound in the armature-slots, one coil from each section being placed in a slot, and a plurality of means to connect all of the sections in pairs, the coils in each pair being in the same slot and of different sections, said means being in number equal to the number of sections and spaced as far apart as possible around the armature.

2. An armature, having slots, including a winding having a plurality of at least three parallel reentrant sections, each section having a plurality of series connected coils wound in the armature-slots, one coil from each section in a slot, and a plurality of means, equal in number to the number of sections, to connect all of the sections in pairs, the coils of each pair being in the same slot and of different sections, said connections being made at places having the same voltage, wave form and phase, said means being spaced as far apart as possible around the armature.

3. An armature, having slots, including a winding having a plurality of at least three parallel reentrant sections, each section having a plurality of series connected coils wound in the armature-slots, one coil from each section being placed in a slot, and a plurality of means, equal in number to the number of coils, to connect all of the sections in pairs, the coils in each pair being in the same slot and of different sections, said connections being made at places between the coils having the same voltage, wave form and phase, said means spaced as far apart as possible around the armature.

4. An armature, having slots, including a triplex, triply reentrant winding, each simplex section thereof having a plurality of series connected coils placed in said slots in said armature, each slot of the armature having a coil therein from each section of the winding, and electric connections joining the sections in pairs, the coils in each pair being in the same slot and of different sections, said connections being three in number and spaced approximately equally distant apart around the armature.

5. An armature, having slots, including a triplex, triply reentrant winding, each simplex section thereof having a plurality of series connected coils wound on said armature, each slot of the armature having a coil from each section of the winding, and electric connections between the sections to join the same in pairs, the coils of each pair being in the same slot and of different sections, said connections being made at places between the coils having the same potential, wave form and phase, said connections being three in number and spaced approximately equally distant apart around the armature.

6. A slotted armature including a winding having at least three simplex wound sections, each section having a plurality of series connected coils wound on said armature, each slot having therein a coil from each section of the winding, and electric connections, equal in number to the number of sections, between the sections joining the sections in pairs, the coils of each pair being in the same slot and of different sections, said connections being made at places between the coils having the same potential, wave form and phase, said connections being spaced approximately equally distant apart around the armature.

7. A motor-armature having slots, three or more simplex windings placed therein, each winding including a series of coils, a series of terminals therefor, a coil from each winding placed in one slot, whereby the potential therein along with the wave form and phase will be identical, means for connecting like terminals of two, and only two, coils in the same slot, each coil so connected belonging to different simplex windings, and additional means for connecting similarly like terminals of other pairs of coils in other slots, the two coils in each of such pairs in the other slots also belonging to a different pair of simplex windings, said connecting means electrically joining all the windings in different combinations of such pairs, there being one connecting means for each pair, the connecting means being in number the same as the number of windings and separated as far as possible from one another around the armature.

8. In an electric motor, an armature having slots, a commutator therefor, the armature having a plurality of at least three windings, each winding being reentrant, and each winding having a plurality of coils in said slots, said commutator including segments for the several windings, a connection to join in pairs the coils of different windings in the same slot, additional connections connecting similarly other coils in other slots, the number of said connections being the same as the number of the windings, each of said pairs connected to a single segment, said windings being disposed on the armature so that the connected places on said windings have the same potential, curve form and phase, said connections being spaced as far apart as possible around the armature, and brushes for co-operating with said commutator, each limited in size so that it can not span more segments than the number representing the number of windings.

9. An electric motor having a commutator, an armature having slots, a plurality of at least three simplex windings therein, a series of coils in each winding, said commutator including segments for the several windings, and connections to join all the windings in pairs, at coils having the same electric characteristics at any instant, each of said pairs having coils lying in the same slot and each coil of the pair belonging to different simplex windings, said connections being equal in number to the number of windings and separated as far as possible from one another, around the armature.

10. An electric motor having a commutator, an armature having slots, a plurality of at least three simplex windings therein, a series of coils in each winding, said commutator including segments for the several windings, connections to join all the windings in pairs, at coils having the same electric characteristics at any instant, each of said pairs having coils lying in the same slot and each coil of the pair belonging to different simplex windings, said connections being equal in number to the number of windings and separated as far as possible from one another, around the armature, and brushes co-operating with said commutator, the spanning width of each brush being no wider than the sum of the segment width plus the insulation width times the number representing the number of the simplex armature-windings.

11. In an electric motor, an armature having at least three simplex windings, each winding having a series of coils, slots in said armature to receive said coils, terminals for the same, and a plurality of connections, each of the same to join like terminals of two, and only two, coils in the same slot, each of such coils being of different simplex windings, said connections joining all of the windings in different pairs and being equal in number to the number of windings and separated as far as possible from one another.

12. In an electric motor, an armature, at least three simplex windings thereon, each winding having a series of coils, slots in said armature to receive said coils, terminals for the same, there being a coil from each winding in each slot, and a plurality of connections, each of the same to join like terminals of two, and only two, coils in the same slot, each of such coils being of different simplex windings, said connections joining all the windings in different pairs and being equal in number to the number of windings and separated as far as possible from one another.

13. In an electric motor, an armature, a set of commutator-bars, three or more simplex windings, each winding having a series of coils, slots in said armature to receive said coils, terminals for the same, and a plurality of connections, each of the same to join like terminals of two, and only two, coils in the same slot, each of such coils being of different simplex windings, said connection located so that the potential diagrams of the interleaved sets of commutator-bars will be identical in shape and phase, said connections joining all the windings in different pairs and being equal in number to the number of windings and separated as far as possible from one another.

ALFRED E. OSWALD.